United States Patent
Kuwabara

(10) Patent No.: US 6,980,686 B2
(45) Date of Patent: Dec. 27, 2005

(54) PATTERN INSPECTION METHOD AND INSPECTION APPARATUS

(75) Inventor: Masayuki Kuwabara, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 675 days.

(21) Appl. No.: 10/067,572

(22) Filed: Feb. 4, 2002

(65) Prior Publication Data
US 2003/0053675 A1 Mar. 20, 2003

(30) Foreign Application Priority Data
Sep. 14, 2001 (JP) .............................. 2001-280141

(51) Int. Cl.[7] .............................................. G06K 9/00
(52) U.S. Cl. ...................................... 382/145; 382/144
(58) Field of Search ....................... 382/141, 143–152; 348/87, 12.6; 256/237.4, 237.5; 250/559.01, 250/559.04–559.09

(56) References Cited

U.S. PATENT DOCUMENTS

| | | | |
|---|---|---|---|
| 5,850,466 A * | 12/1998 | Schott | 382/141 |
| 5,949,901 A * | 9/1999 | Nichani et al. | 382/149 |
| 6,347,150 B1 | 2/2002 | Hiroi et al. | |
| 6,614,924 B1 * | 9/2003 | Aghajan | 382/149 |
| 2002/0181757 A1 | 12/2002 | Takeuchi | |

FOREIGN PATENT DOCUMENTS

| | | |
|---|---|---|
| JP | 10-89931 | 4/1998 |
| JP | 2000-172843 | 6/2000 |

* cited by examiner

Primary Examiner—Vikkram Bali
(74) Attorney, Agent, or Firm—Christie, Parker and Hale, LLP

(57) ABSTRACT

A pattern inspection method and a pattern inspection apparatus, which are able to detect a killer defect as a defect candidate and also reduce considerably the number of non-killer defects detected as a defect candidate, have been disclosed, wherein a differential image of two patterns to be compared is calculated, with the polarities included, and after the absolute value of the differential image is compared with a first threshold value to detect the part as a defect candidate, the polarities of the differential image of the part of the defect candidate are inspected and the part of one of the polarities is judged as a defect candidate.

24 Claims, 11 Drawing Sheets

DIE-DIE COMPARISON

CELL-CELL COMPARISON

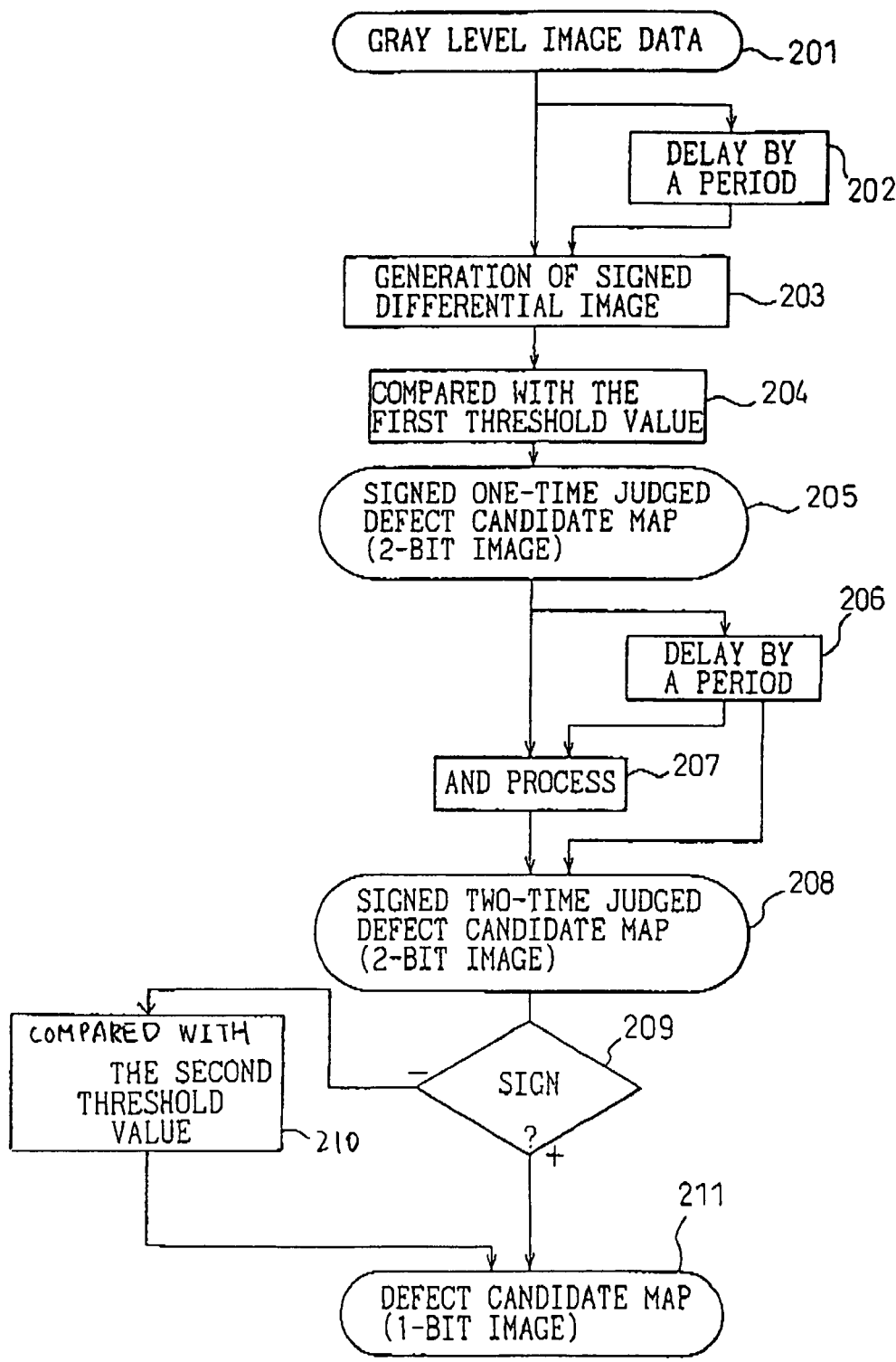

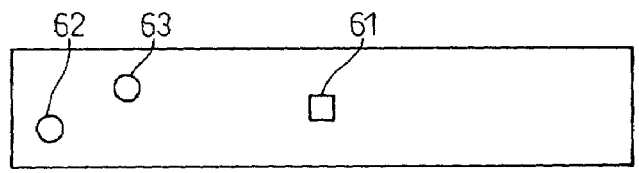
Fig.8A GRAY LEVEL IMAGE
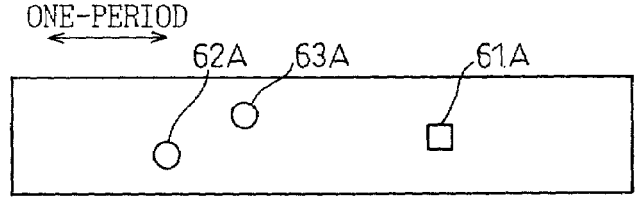
Fig.8B IMAGE DELAYED BY A PERIOD
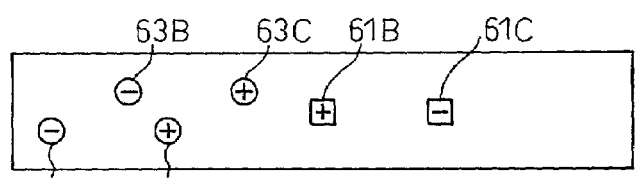
Fig.8C SIGNED ONE-TIME JUDGED DEFECT CANDIDATE MAP
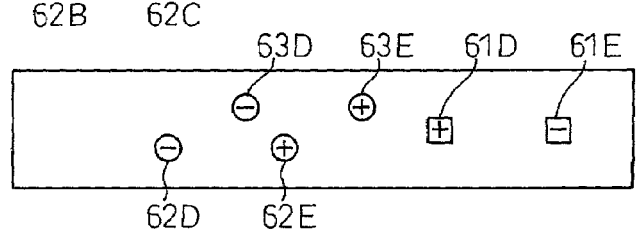
Fig.8D ONE-PERIOD DELAYED ONE-TIME JUDGED MAP
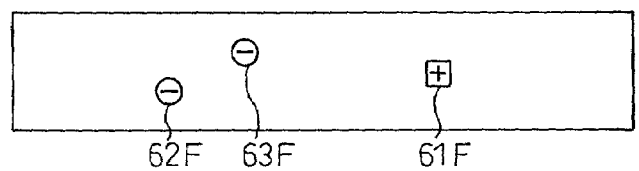
Fig.8E SIGNED TWO-TIME JUDGED MAP
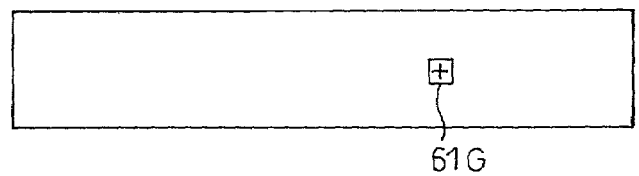
Fig.8F DEFECT MAP

GRAY LEVEL IMAGE

IMAGE DELAYED BY A PERIOD

SIGNED ONE-TIME JUDGED DEFECT CANDIDATE MAP

ONE-PERIOD DELAYED ONE-TIME JUDGED MAP

SIGNED TWO-TIME JUDGED MAP

DEFECT MAP

SIGNED TWO-TIME
JUDGED MAP

GRAY LEVEL
IMAGE

PATTERN INSPECTION METHOD AND INSPECTION APPARATUS

CROSS-REFERENCE TO RELATED APPLICATION

This application claims priority of Japanese patent Application No. 2001-280141, filed on Sep. 14, 2001.

BACKGROUND OF THE INVENTION

The present invention relates to an inspection method and an inspection apparatus to detect a pattern defect by comparing patterns, which should be identical, and judging a mismatching part as a defect. More particularly, the present invention relates to an inspection method and an inspection apparatus to detect a defect in repetitive patterns of such as in semiconductor wafers, photomasks, and liquid crystal display panels.

A fixed pattern is repetitively formed on a semiconductor wafer, a semiconductor memory photomask, and a liquid crystal display panel etc. Therefore a pattern defect is detected, currently, by capturing the optical image of the pattern and comparing it with adjacent patterns. If no difference is found between the two patterns in the comparison, the patterns are judged to be nondefective and if any difference is found, it is judged that one pattern is defective. As such an apparatus is generally called an appearance inspection apparatus, this term is also used here. In the following description, the semiconductor wafer appearance inspection apparatus, which inspects the patterns formed on a semiconductor wafer for a defect, is described as an example. The present invention, however, is not restricted to this apparatus, but can be applied to appearance inspection apparatuses for a semiconductor memory photomask and a liquid crystal display panel etc., and moreover, to any apparatus with a structure in which patterns, which should be identical, are compared for defect inspection.

The manufacture of a semiconductor device includes a great number of processes and it is important to be able to detect the occurrence of defects in the final and intermediate processes to feed back the result to the manufacturing process, from the standpoint of yield enhancement. Therefore, an appearance inspection apparatus is widely used to detect such a defect. FIG. 1 is a diagram that shows the rough structure of a semiconductor wafer appearance inspection apparatus. As shown in FIG. 1, the semiconductor wafer appearance inspection apparatus comprises an image generation section 1 that generates the image signal of the surface of a semiconductor wafer, a defect candidate detection section 2 that detects a part that has the possibility of being a defect (defect candidate) by converting the image signal into digital data and comparing the corresponding patterns, and an automatic defect classification (ADC) section 3 that analyzes and classifies defect candidates into killer defects (fatal defects) that affect the yield and non-killer defects that can be ignored.

The image generation section 1 comprises a stage 18 that holds a semiconductor wafer 19, an optical system 11 that generates the surface image of the semiconductor wafer 19, and a control unit 20. The optical system 11 comprises a light source 12, illuminating lenses 13 and 14 that converge the illuminating light from the light source 12, a beam splitter 15 that reflects the illuminating light, an objective lens 16 that irradiates the illuminating light onto the surface of the semiconductor wafer 19 and at the same time projects the optical image of the surface of the semiconductor wafer 19, and an image pickup device 17 that converts the projected optical image of the surface of the semiconductor wafer 19 into the electrical image signal. As for the image pickup device 17, a TV camera employing two-dimensional CCD elements can be used, but in most cases, a line sensor, such as a one-dimensional CCD or TDI sensor, is used to obtain the image signal at a high resolution and images are captured by relatively moving (scanning) the semiconductor wafer 19 using the stage 18. Therefore, if optical images are captured by the line sensor while moving the semiconductor wafer 19 in the direction of the repetitive arrangement of patterns, the image signal of the same part of the pattern is eventually generated at fixed periods. Since the structure of the image generation section 1 is widely known, a fuller description is not given here.

The defect candidate detection section 2 comprises an analog-digital converter (A/D) 21 that converts the image signal put out from the image pickup device 17 into multi-valued digital image data and a double detection circuit 22 that processes the digital image data, compares the same part of the pattern, and detects a defect candidate. The process in the defect candidate detection section 2 will be described later.

The ADC 3 analyzes the digital image data of the part of a defect candidate reported from the defect candidate detection section 2 and classifies the defect candidate.

Next the process in the double detection circuit 22 is further described. As described above, plural semiconductor chips (dies) are formed on the semiconductor wafer so as to be regularly arranged. The pattern of each die is identical because the same mask pattern is exposed. Therefore, the same pattern is repeated with pitches of the die arrangement as shown in FIG. 2A, and a comparison between two adjacent dies can be made. Such a comparison is called a die-die comparison. If there is no defect, the pattern coincides with each other, but a difference is found in the comparison result if a defect exists. When there exists a difference, however, it cannot be determined as to which one of the two dies is defective by the one-time comparison. Then, the comparison is made, twice, with the dies on both sides of each die as shown in FIG. 2A, and the part is judged to be non-defective if there is no difference in the two-time comparison and the part is judged to be defective if there exist a difference in each comparison of the two-time comparison. This method of judgment with the two-time comparison is called the double detection. The method of judgment with the one-time comparison is called the single detection. In either case, both methods of defect judgment, in which a comparison is made between two adjacent patterns, are based on a premise that the occurrence frequency of defects is comparatively low and that there is little possibility of the existence of defects on the same part of a pattern at the same time. In fact the occurrence frequency of fatal defects in patterns formed on a semiconductor wafer is very low in the manufacturing process and, therefore, such a premise does not lead to any problem.

As described above, the semiconductor wafer 19 is scanned by the optical system 11 that comprises the line sensor 17, and the image data corresponding to the scan width is generated sequentially as the scanning time elapses. Therefore, when the double detection is carried out, the image of die A is delayed by a repetition period and compared with that of die B sequentially and then, similarly, the image of die B is delayed by a repetition period and compared with that of die C sequentially, and the double detection process of die B is completed, as shown in FIG. 2A. Similarly, the double detection process is repeated for dies C, D, . . . , until the process is completed for all dies. Although the process for the first die A is the single detection process, it is effective because die B has been inspected and a mismatching part between die A and die B can be judged to be defective or not, but it is also applicable to compare die A with another die. The image data of the die for which the two-time comparison has been made can be deleted sequentially, and if it is designed so that the image data of the next die can be stored in the part of memory from which the previous data has been deleted, the memory capacity is sufficient if it can store the full image data of a die. In other words, the memory in this case functions as a delay memory that delays the image data by a repetition period. It is also applicable to provide a memory with a capacity large enough for the image data of all dies of a semiconductor wafer. In this case, an enormous memory capacity is required, but it is no longer necessary to generate the image data again by scanning the semiconductor wafer for the analysis of the defective part in the ADC 3.

A unit pattern called a cell is arranged repeatedly at fixed periods in the arrangement part of the memory cells of the semiconductor memory. In such a part, a comparison between cells can be made, and such a comparison is called the cell-cell-comparison. FIG. 2B shows the cell-cell-comparison and the double detection process is sequentially carried out between two adjacent cells among cells P-S in the same manner as the die-die comparison.

The double detection process needs to be performed in synchronization with generation of image data and a very high speed processing ability is required. Although a circuit to perform such a process can be realized by a structure that combines a delay memory and a comparison circuit, in most cases it is realized by a structure that combines a pipeline data processing processor and a working memory, because it is difficult to adjust comparison positions and make the repetition period variable.

FIG. 3 is a flow chart that shows the defect candidate detection process of the defect candidate detection section 2. Digitized multivalued (gray level) image data 100, which is put out sequentially from the A/D 21, is delayed by an amount of time corresponding to a repetition period (die arrangement pitch in the die-die comparison, or cell arrangement pitch in the cell-cell comparison) in step 101. This process corresponds to a process to access and read the previous gray level image data by a repetition period stored sequentially in the working memory. In step 102, a differential image is generated by operating the difference between the gray level image data and that delayed by a period, that is, the difference between the two gray level image data separated from each other by an arrangement pitch. The operation in this case is an operation to calculate the absolute value of the difference in the gray level image data that does not relate to the polarity, therefore the obtained differential image is also the data that does not relate to the polarity.

In step 103, the differential image is compared with a fixed threshold value to detect the part at which the value of the differential image is greater than the threshold value. In other words, the part at which the difference between two gray level image data is great is detected in this process. In this manner, a two-valued one-time judged image 104 can be obtained. That is, the one-time judged image 104 is the result of the single detection process.

In step 105, the one-time judged image 104 is further delayed by a period. During this, the above-mentioned steps are performed to obtain the next one-time judged image 104 and the AND operation is performed in step 106 between the one-time judged image 104 delayed by a period and that which is not delayed. In this manner, a two-time judged image 107 that indicates the part where the difference is great in both comparisons can be obtained. That is, the two-time judged image 107 is the result of the double detection process and is a defect candidate image.

For the semiconductor wafer appearance inspection apparatus, it is essential to be able to detect every part that includes a difference without fail, therefore, it is designed so as to recognize the part as a defect, at which the difference between the two images exceeds a fixed threshold value, as described above. Therefore, the number of the parts judged to be a defect candidate depends considerably on the specified threshold value. As described above, the part judged to be a defect candidate is reported to the ADC 3 and analyzed again whether it is a fatal defect (killer defect) that affects the yield of the semiconductor device. A problem, however, is caused that the time required for analysis increases as the number of the defect candidates increases and the throughput is degraded, because the pipeline processing of this part is difficult and a considerable time is required for the analysis of a part. Therefore, it is preferable that the double detection circuit 22 detects every killer defect as a defect candidate without fail but detects as few non-killer defects as possible.

There exists, however, another problem that it is difficult to meet the demand only with the setting of the threshold value because the part at which the difference between two images is great is not always a killer defect. In the metal process of the semiconductor device, for example, the killer defect that users want to detect is a short between patterns and it will be preferable if a non-killer defect such as a metal grain is left out of defect candidates. In many cases, however, the difference in gray level resulted from the metal grain is by far greater than that resulted from the part of a short between patterns. Therefore, if the threshold is set to a value so that the metal grain is not detected at all as a defect candidate, a short between patterns, which should be primarily detected, is seldom detected. As a result, a threshold is set to a value so that a short between patterns is detected without fail, with not only a short and but also a metal grain being detected temporarily as a defect candidate, and the ADC 3 classifies them according to whether they are killer defects or not.

Conventionally, the ADC 3 is not provided and the classification is performed by a visual inspection of each defect candidate that is moved again to the stage of a microscope using an appearance inspection apparatus or another apparatus called the review station, therefore, an enormous time is required for classification when there exist many metal grains. Recently, the trend is beginning to appear that the ADC 3 is employed for automatic classification but, for the automatic classification, the image of the die that includes the detected defect candidate and at least one of the die images used in the comparison are needed, and it is necessary to obtain these images again, send them to the ADC 3, and detect the defect candidates again before the classification of the defects. If a memory with a capacity large enough to store image data of all dies of a single semiconductor wafer is provided, as described above, it is no longer necessary to obtain image data of the semiconductor wafer again for analysis of defective parts in the ADC 3, but the memory capacity required for image data of all dies is tremendously large, resulting in considerable increase in cost.

As described above, the double detection circuit performs the comparison process at a speed as high as, for example, 1 G pixel/second, in order to realize a high throughput, therefore, this part forms a considerable proportion of the cost of the appearance inspection apparatus. In other words, it can be said that the cost of the apparatus and the throughput thereof are in an inverse relation, and the processing performance of the double detection circuit (a pipeline data processing processor and a memory) had to be specified, various factors being taken into consideration. As a result, for example, an upper limit was set to the number of defect candidates that can be reported per unit processed image, and when the number of detected defect candidates exceeds the upper limit, it is reported that a single large defect exists in the unit processed image. As described above, it causes a problem that a tremendous cost and processing time are required to send the two image data relating to all the detected defect candidates to the automatic defect classification (ADC) section and detect again the defect candidates among all the defect candidates for classification in the ADC.

SUMMARY OF THE INVENTION

The object of the present invention is to realize a pattern inspection method and an inspection apparatus that can not only detect a killer defect as a defect candidate but also considerably reduce the number of non-killer defects detected as a defect candidate.

In order to realize the above-mentioned object, the pattern inspection method and the inspection apparatus of the present invention are characterized in that the differential image of the two patterns to be compared is calculated, with the polarities included, and after a part is detected as a defect candidate by the comparison of the absolute value of the differential image with a first threshold value, the polarities of the differential image of the part of the defect candidate are inspected and the part of one of the polarities is judged to be a defect.

In a semiconductor device on a semiconductor wafer using a bright field microscope, characteristically in the pattern defect inspection in a metal process, in most cases the gray level of a killer defect such as a pattern short that needs to be detected is higher than that of the corresponding normal part, while the gray level of a non-killer defect such as a grain that does not need to be detected is lower than that of the corresponding normal part. Therefore, it is possible to judge a defect candidate as a killer defect or a non-killer defect by inspecting the polarities of the differential image of the part of the detected defect candidate, after the part at which the absolute value of the differential image is greater than the first threshold value is detected as a defect candidate. Then, the defect candidate of one of the polarities corresponding to a killer defect is left as a defect candidate. The operation on the differential image including the polarities is appropriate for the process performed by the pipeline data processing processor because the operation is performed successively to each pixel. Moreover, since the judgment of polarities is performed only on a defect candidate, the degradation of the throughput of a defect candidate detecting process, due to this process, is slight.

As for the defect candidate of the other polarity, the absolute value of the differential image of the part thereof is compared with a second threshold value, which is larger than the first threshold value, and when the second threshold value is exceeded, the part is included among defect candidates. In this manner, the judgment with different threshold values is performed according to the polarity of the detected defect candidate.

The principle of the present invention is described here in detail with an example case in which the image of the metal layer of a semiconductor device is captured by a bright field microscope. FIG. 4A is an example of the pattern of the metal layer of the semiconductor device, and FIG. 4B shows the gray level image thereof captured by the bright field microscope.

As shown in FIG. 4A, metal wires 51 and spaces 52 therebetween are arranged at fixed intervals. Reference number 53 refers to a pattern short, which is a killer defect, reference number 54 refers to a large metal grain, which is a non-killer defect, and reference number 55 refers to a small metal grain, which is a non-killer defect. As shown in FIG. 4B, the reflectance of the part of the metal wire 51 is high and the gray level is as high as 200, and that of the space 52 is low and the gray level is as low as 30. Since the part in which a defect of pattern short exists always corresponds to the space part, the gray level of the pattern short part is higher than that of the normal reference part with which a comparison is made. Concretely speaking, while the gray level of the space part, which is the reference part, is 30, that of the pattern short part is 60.

Generally, a metal grain has a sectional structure as shown in FIG. 5, and illuminating light that enters through an objective lens is scattered on the grain, therefore, the gray level becomes low. In other words, the gray level of the grain part is lower than that of the normal metal wire part without a grain, which is the reference part, when compared with each other. Concretely speaking, while the gray level of the metal wire part, which is the reference part, is 200, that of the large grain part 54 is 60 and that of the small grain part 55 is 150.

In this example, it is impossible to prevent a grain on the metal wire from being detected while being able to detect a pattern short between metal wires by the conventional method of judgment in which a comparison is made between the absolute value of the differential image and a single threshold value. This is because the difference in gray level between the pattern short part and the normal space part is 30, but that between the small grain part and the normal metal wire part is 50.

Contrary to this, the polarity of the differential image is further included as an element of judgment in the present invention. As described above, since the gray level of the pattern short part is 60 and that of the normal space part, which is the reference part, is 30, the difference with respect to the reference part is +30. On the other hand, the gray level of the small grain part is 150 and that of the normal metal wire part is 200, therefore, the difference with respect to the reference part is −50. Therefore, if the polarities of the differential image are judged, it is possible to judge whether it is a killer defective pattern short or a non-killer defective metal grain.

The present invention can be applied to both the single detection process and the double detection process. In the case of the double detection process, a part is judged as a defect candidate, at which two parts in the two differential images, where the absolute value of the differential image is greater than the first threshold value, overlap each other, and then the polarities of the differential image of the defect candidate are inspected.

The occurrence frequency of the grain is comparatively high, and it may happen that two grains are formed apart from each other by two repetition periods, though it is a rare case. In such a case, a defect candidate of the same polarity as that of a pattern short appears between the two grains apart from each other by two repetition periods and a part without a pattern short or a grain may be detected as a defect candidate. In order to prevent the detection of such a nuisance-defect candidate, a third differential image is further generated between the gray level image of the part left as a defect candidate and a third pattern other than the two patterns used to generate the two differential images in the double detection process, and the part is left as a defect candidate when the absolute value of the third differential image is greater than a third threshold value, and left out of defect candidates, when less. For example, if the probability of a nuisance-defect being detected when two grains are formed apart from each other by two repetition periods is assumed to be 1/10, it can be reduced to 1/100 by this method. By repeating this method, the probability of a nuisance-defect being detected can be further reduced. After this method is carried out, for example, if a fourth differential image is further generated between the gray level image of the part left as a defect candidate and another fourth pattern, and the part is left as a defect candidate when the absolute value of the fourth differential image is greater than a fourth threshold value, and left out of defect candidates, when less, the probability of a nuisance-defect candidate being detected when two grains are formed apart from each other by two repetition periods becomes 1/1000. Since these processes are performed only to the parts detected as a defect candidate, the number of target parts for a process is low and the problem of degradation of throughput is seldom caused.

BRIEF DESCRIPTION OF THE DRAWINGS

The features and advantages of the invention will be more clearly understood from the following description taken in conjunction with the accompanying drawings, in which:

FIG. 7 is a flow chart that shows the defect candidate detection process in the first embodiment of the present invention;

FIG. 8A through FIG. 8F are diagrams that illustrate the defect candidate detection process in the first embodiment of the present invention;

DESCRIPTION OF THE PREFERRED EMBODIMENTS

Figure 1:
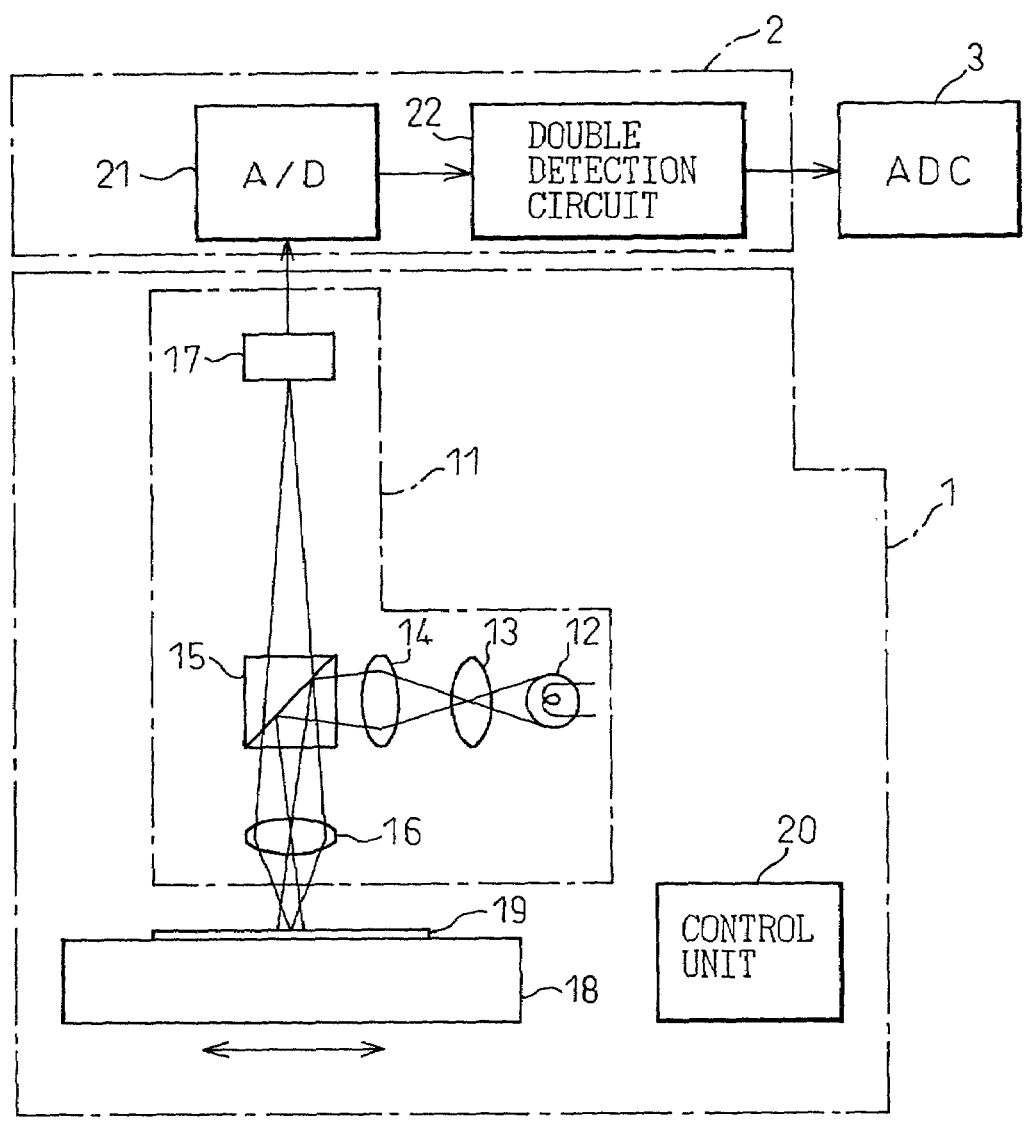
FIG. 1 is a diagram that shows the rough structure of the conventional semiconductor wafer appearance inspection apparatus.
Figure 2A:
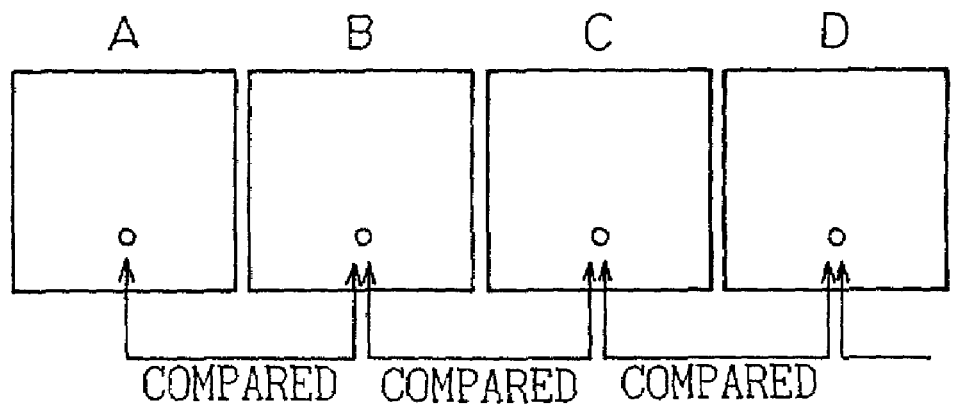
FIG. 2A is a diagram that illustrates the die-die comparison in the semiconductor wafer appearance inspection apparatus.
Figure 2B:
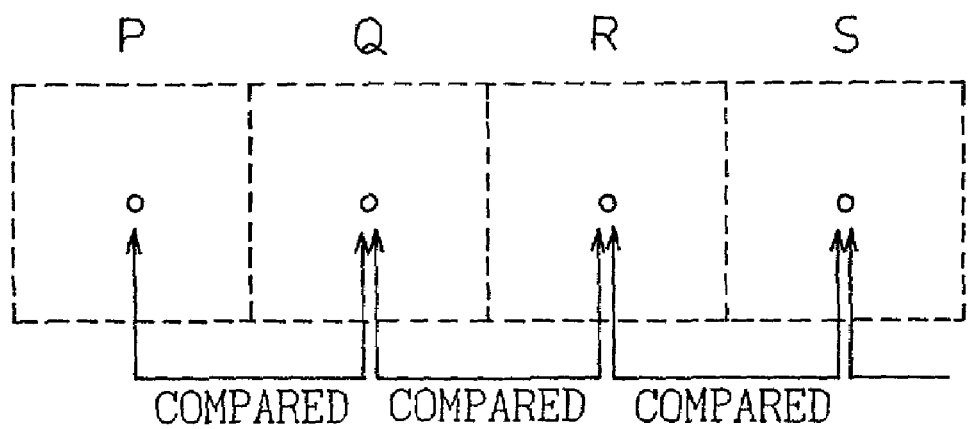
FIG. 2B is a diagram that illustrates the cell-cell comparison in the semiconductor wafer appearance inspection apparatus.
Figure 3:
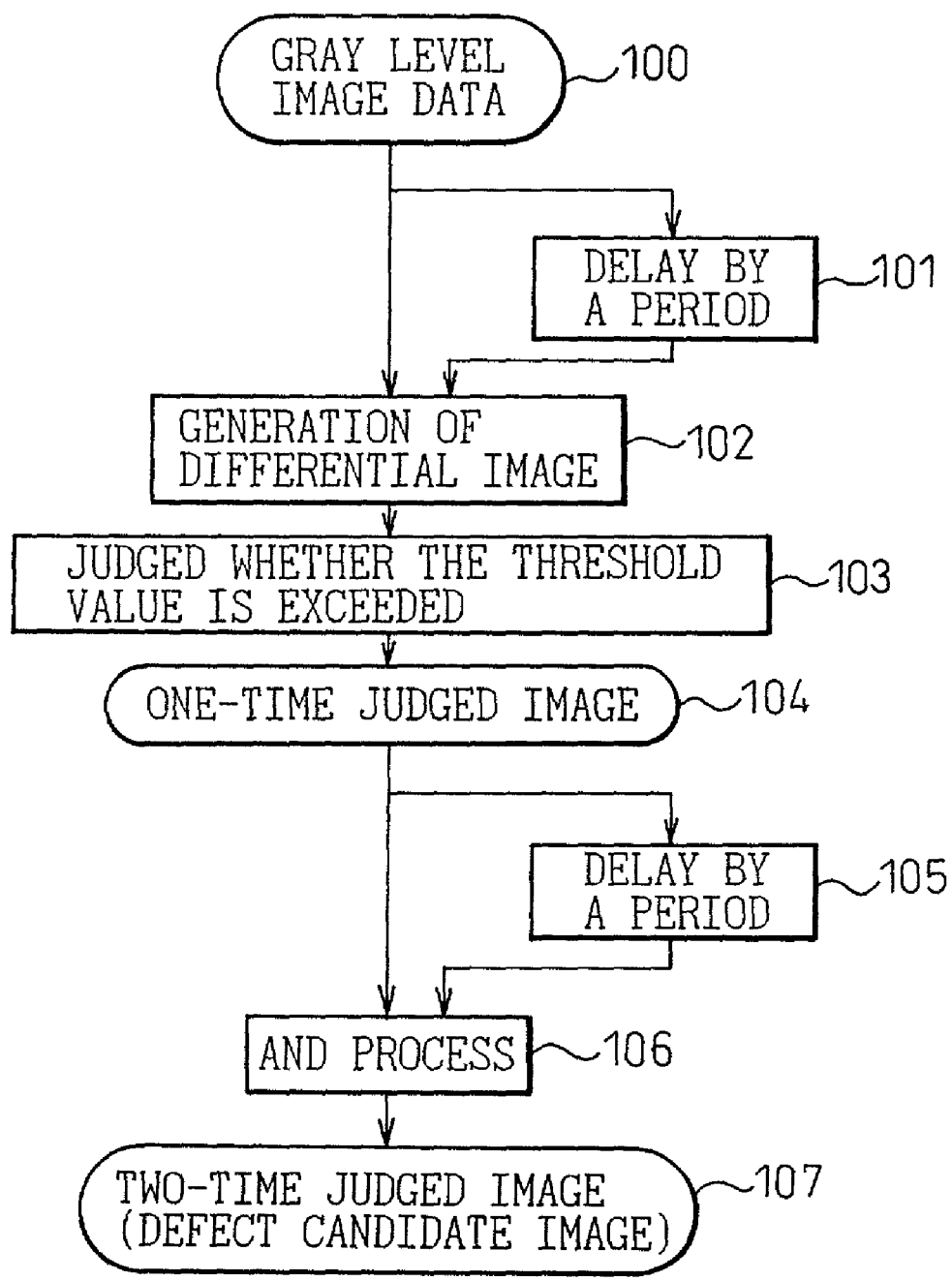
FIG. 3 is a flow chart that shows the defect candidate detection process of the conventional semiconductor wafer appearance inspection apparatus.
Figure 4:
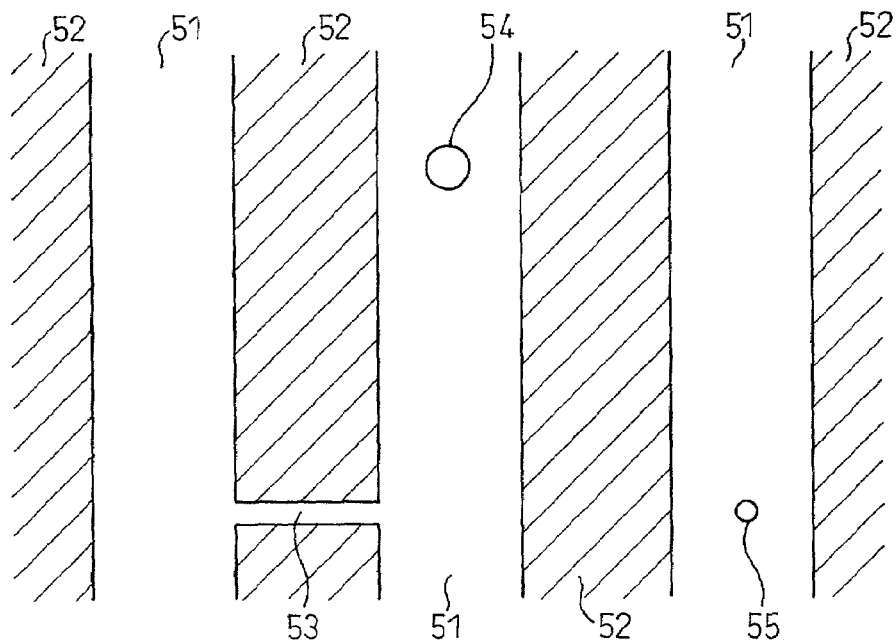
FIG. 4A and FIG. 4B are diagrams that illustrate the principle of the present invention with an example of the metal wire layer of the semiconductor device.
Figure 5:
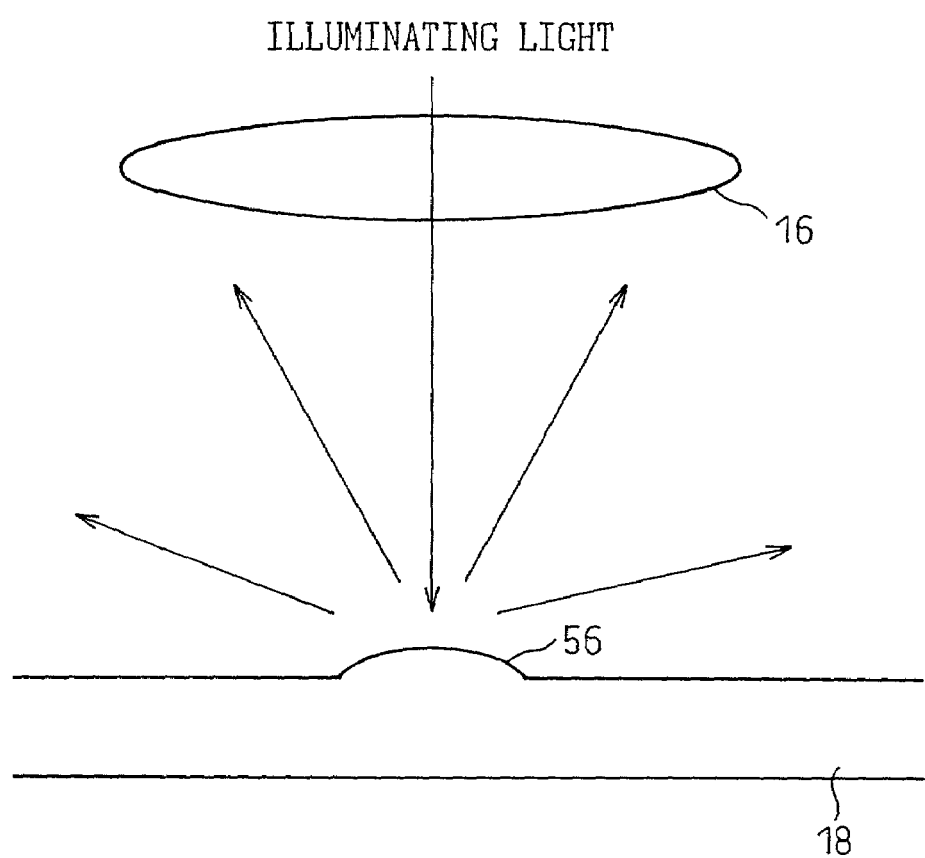
FIG. 5 is a diagram that illustrates the degradation of reflectance due to a metal grain.
Figure 6:
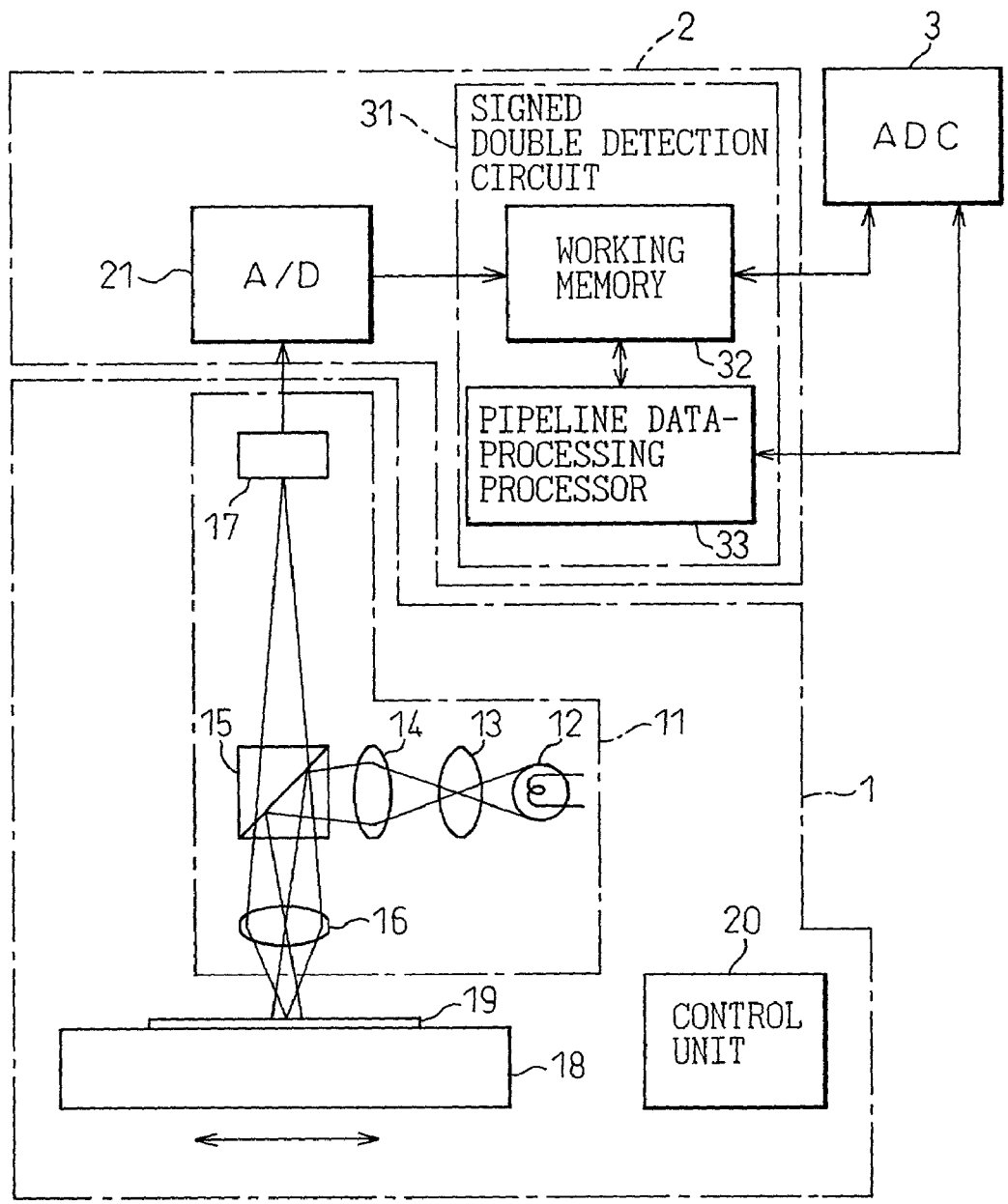
FIG. 6 is a diagram that shows the rough structure of the semiconductor wafer appearance inspection apparatus in the embodiment of the present invention.

FIG. 6 is a diagram that shows the rough structure of the semiconductor wafer appearance inspection apparatus in the embodiment of the present invention, and the structure differs from the conventional one shown in FIG. 1 in that a signed double detection circuit 31 is employed instead of the double detection circuit 22. Therefore, a description of circuits other than the signed double detection circuit 31 is omitted here.

The signed double detection circuit 31 comprises a working memory 32 and a pipeline data processing processor 33. The working memory is required to have a memory capacity large enough to perform the double detection. It is further required to have a memory capacity large enough to store the gray level image data of four or more repetition periods for the second embodiment. It is also possible to provide an auxiliary processor that performs processes other than the pipeline process, in addition to the pipeline data processing processor 33.

FIG. 7 is a flow chart that shows the defect candidate detection process in the first embodiment, and FIG. 8A through FIG. 8F are diagrams that show examples of the image data corresponding to the process. In the first embodiment, description is made with an example of the cell-cell comparison. The process in the first embodiment is described with reference to FIG. 7 and FIG. 8.

Gray level image data 201 that is put out from the A/D converter 21 is generated in a manner similar to a conventional one. In the gray level image data 201, there exist a pattern short 61 and metal grains 62 and 63 as shown in FIG. 8A. The pattern is assumed to repeat at the periods shown in FIG. 8A The gray level image data 201 is delayed by a repetition period in step 202 as shown in FIG. 8B. In step 203, the gray level image data that is delayed by a repetition period is subtracted from the gray level image data 201 to generate a signed differential image. In step 204, the absolute value of the signed differential image is compared with the first threshold value to obtain the part where the absolute value is greater than the first threshold value, the part judged to be greater is provided with the sign of the differential image, and a signed one-time judged defect candidate map 205 is generated. The one-time judged defect candidate map is composed of, for example, 2-bit data, the upper bit representing the sign, and the lower bit indicating whether the first threshold value is exceeded or not. In the case of the gray level image as shown in FIG. 8A, the part of the pattern short 61 corresponds to +, the part of a pattern short 61A that is delayed by a period corresponds to −, the parts of the grains 62 and 63 correspond to −, and the parts of the grains 62 and 63 delayed by a period correspond to +, in the one-time judged defect candidate map shown in FIG. 8C. The one-time judged defect candidate map is the result of the so-called single detection, therefore, the double detection is further performed in steps 206 and 207 because the decision as to which one is defective is not made.

In step 206, the one-time judged defect candidate map is further delayed by a repetition period to obtain the one-period delayed one-time judged map as shown in FIG. 8D. In step 207, the lower bits of the one-time judged defect candidate map and the one-period delayed one-time judged map, which indicate whether the first threshold is exceeded or not, are AND-operated to generate the two-time judged defect candidate map. This is equivalent to the case in which the conventional double detection is performed. Further, in the present embodiment, the upper bit of the one-period delayed one-time judged map is added to the two-time judged defect candidate map as a sign to obtain a signed two-time judged defect candidate map 208. In the signed two-time judged defect candidate map shown in FIG. 8E, a defect candidate 61F of a pattern short corresponds to + and defect candidates 62F and 63F of grains correspond to −.

Subsequently, the signs of all the defect candidates in the signed two-time judged defect candidate map 208 are judged in step 209, and the defect candidate 61F with one of the signs (in this case +) is left as a defect candidate. As for the defect candidates 62F and 63F with the other sign (in this case −), the absolute values of the signed differential images thereof provided in step 203 are compared in step 210 with the second threshold value that is greater than the first threshold value, and included among the defect candidates if the second threshold value is exceeded. In this manner, the one-bit defect candidate map can be finally obtained. When the absolute values of the signed differential images of the defect candidates 62F and 63F are less than the second threshold value, the defect candidate map as shown in FIG. 8F is obtained.

The occurrence frequency of the metal grain is higher than that of the pattern short. Therefore, it may happen that metal grains are formed one or two repetition periods apart from each other. When the metal grains are formed one period apart from each other, they are not detected as a defect candidate because there is no difference between the differential images, but this does not cause any problem because they are not killer defects originally. When the metal grains are generated two periods apart from each other, however, such a problem is caused that the a nuisance-defect candidate left as a final defect candidate therebetween is detected. The detection of the nuisance-defect candidate is described below with reference to FIG. 9A through FIG. 9F.

Figure 9A:
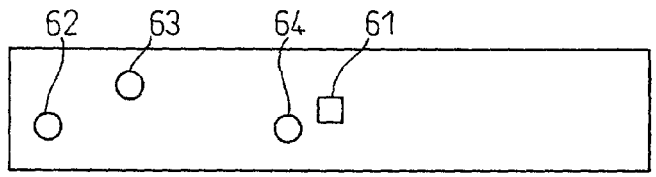
FIG. 9A through FIG. 9F are diagrams that illustrate the occurrence of a nuisance-defect candidate in the defect candidate detection process in the first embodiment.
Figure 9B:
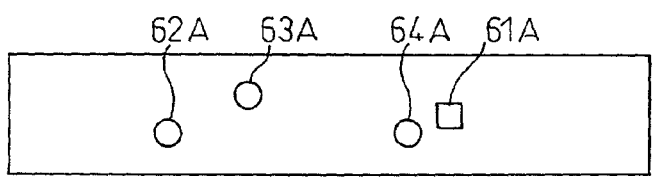
Figure 9C:
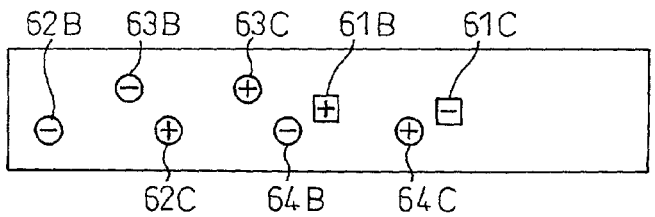
Figure 9D:
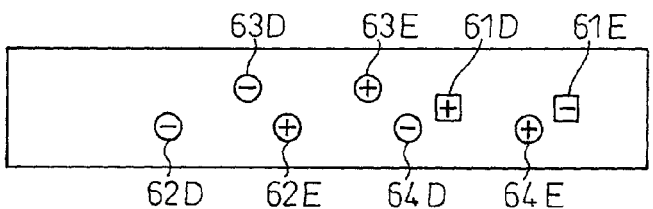
Figure 9E:
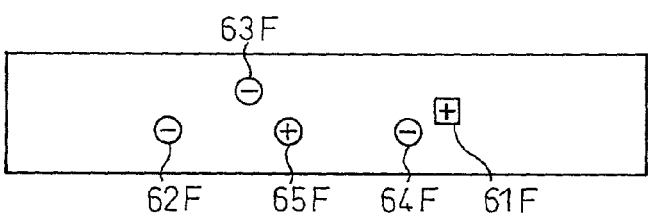
Figure 9F:
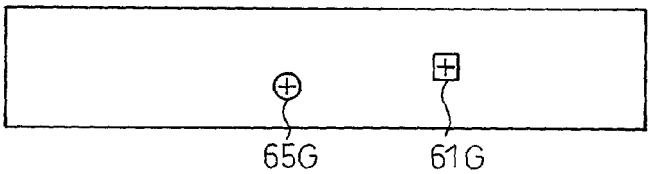

It is assumed that there exist the pattern short 61, the grains 62 and 63, and a grain 64 in the gray level image data and the grains 62 and 64 are apart from each other by two repetition periods, as shown in FIG. 9A. By following the flow chart in FIG. 7, the image in FIG. 9E is generated from that in FIG. 9B and the signed two-time judged map as shown in FIG. 9E can be obtained. In the signed two-time judged map, in addition to the defect candidates 61F, 62F, 63F, and a defect candidate 64F that correspond to the pattern short 61 and the grains 62–64, a defect candidate with the + sign is detected in the part where neither the pattern short nor the grain exists. Since the sign of this defect candidate is +, it is left as a final defect candidate. As a result, a nuisance-defect candidate is detected in a part where neither the pattern short nor the grain exists originally. Since such a nuisance-defect candidate is formed when grains are formed two repetition periods apart from each other, the detection frequency is much less than the occurrence frequency of the grain. If, however, the occurrence frequency of the grain is considerably high, the proportion of the nuisance-defect candidates to the final defect candidates cannot be ignored and the throughput is degraded because the more time is required for the process in the ADC 3 accordingly. In the second embodiment, a process, in which these nuisance-defect candidates are left out of the final defect candidates, is performed.

Figure 10A:
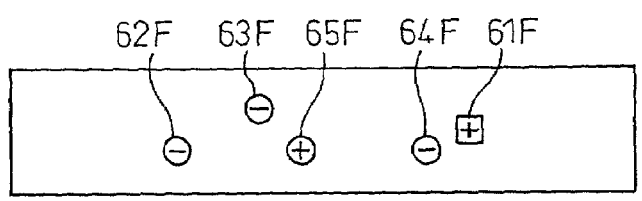
FIG. 10A and FIG. 10B are diagrams that illustrate the judgment process of a nuisance-defect candidate in the second embodiment of the present invention.
Figure 10B:
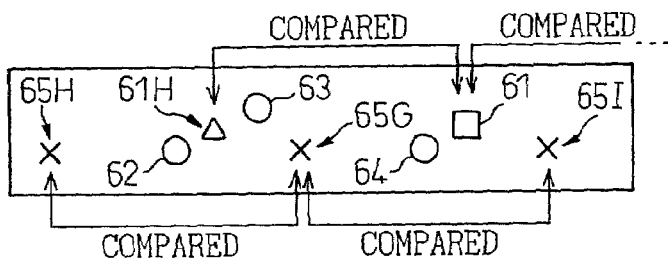

FIG. 10A and FIG. 10B are diagrams that illustrate the method of judging a nuisance-defect candidate. From the gray level image shown in FIG. 9A, the signed two-time judged map shown in FIG. 10A can be obtained. As for the defect candidate 61F and a defect candidate 65F the sign of which is + in the map, the differential images from the part apart by two repetition periods are generated, respectively. Concretely speaking, the differences of the pattern short 61 from part 61H apart by two periods to the left and the part (not shown) apart by two periods to the right, are calculated, respectively and, similarly, the differences of a nuisance-defect candidate 65G from part 65H apart by two periods to the left and part 65I apart by two periods to the right are calculated, respectively, and judged whether the third threshold value is exceeded. The only one condition required for the third threshold value is its ability to detect the difference, in the case of the pattern short, sufficiently. Therefore, the first threshold value, for example, can be used, but the value is not restricted to it. In the case of the pattern short 61, the possibility of the existence of the same pattern shorts apart by two periods from each other is very small, therefore, there exists a certain amount of difference and the difference is greater than the third threshold value. In the case of the nuisance-defect candidate, on the contrary, the grains do not exist and the possibility of the existence of the grains apart by two periods from each other is also small, therefore, there does not exist any difference and the difference is less than the third threshold value. In this way, they can be judged to be nuisance-defect candidates. Although almost all the nuisance-defect candidates can be excluded by a comparison with only one of the parts apart by two periods to both sides, there exists the possibility that a considerable number of nuisance-defect candidates are not excluded by the comparison with only one of the parts apart by two periods when the occurrence frequency of the grain is high, therefore, in this case, a comparison with the other part apart by two periods needs to be made only when the difference is judged to be greater than the third threshold value by the comparison with only one of the parts apart by two periods. This comparison is not restricted to one or two times, and it is advisable to compare with parts apart by integer multiples of a period, if necessary. It is also advisable to make the first and second comparisons with parts apart by integer multiples of a periods instead of the parts apart by two periods.

Figure 11:
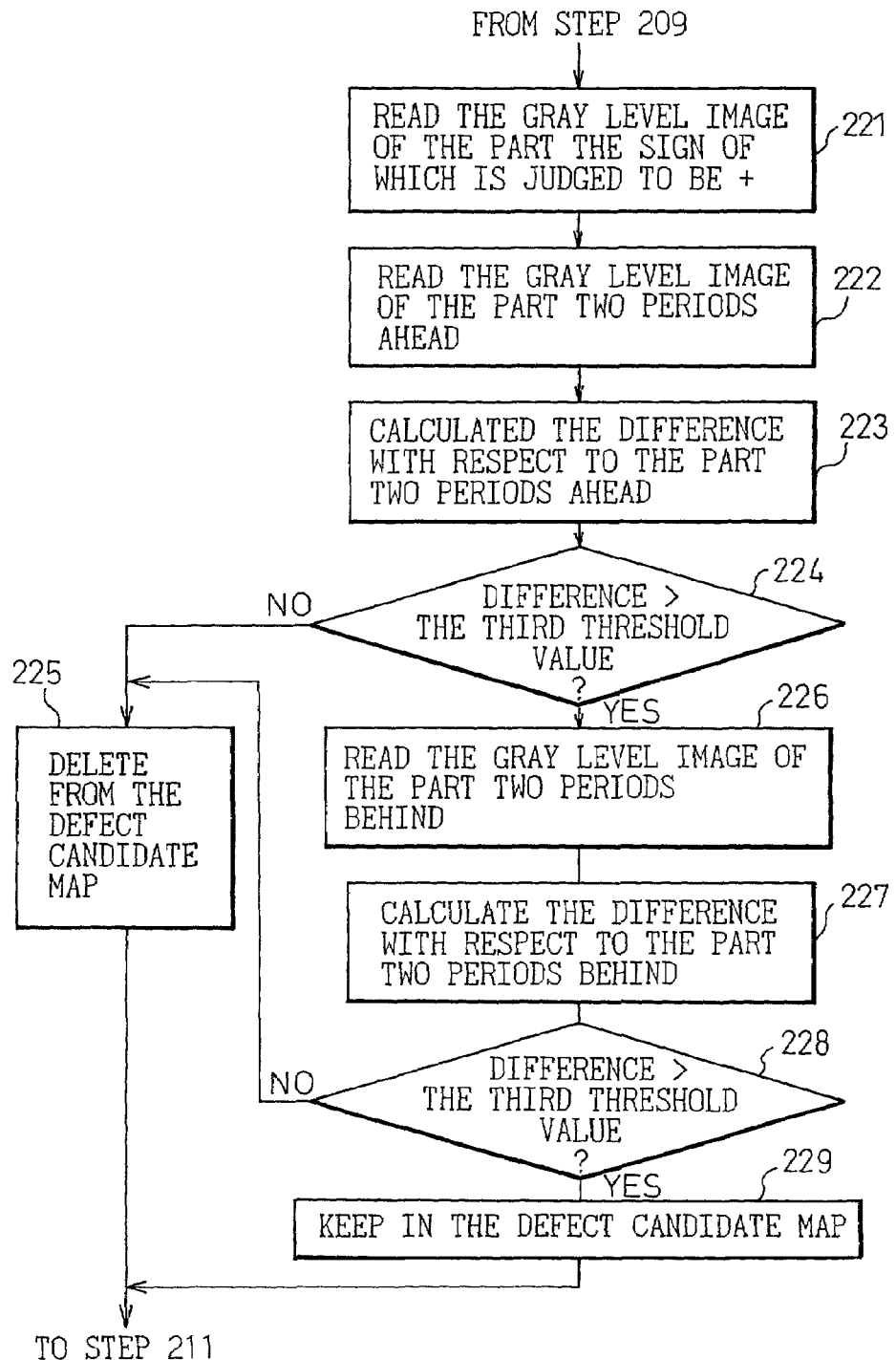
FIG. 11 is a flow chart that shows the defect candidate detection process in the second embodiment of the present invention.

FIG. 11 is a flow chart that shows the defect candidate detection process in the second embodiment. In the second embodiment, after step 221 through step 229 in FIG. 11 are applied to the defect candidates, the sign of which is + in the signed two-time judged defect candidate map in step 209 in FIG. 7 in the first embodiment and which has been judged to be left in the final defect candidate map, step 211 in FIG. 7 is applied. In the second embodiment, it is assumed that the working memory is able to store the gray level image data of four or more repetition periods.

In step 221, the gray level image of the part of the defect candidate, the sign of which has been judged to be + in step 209, is read. In step 222, the gray level image two periods ahead (−2 periods) is read. In step 223, the difference between the two is calculated. In step 224, whether the difference is greater than the third threshold value is judged, and if less, it can be regarded as a nuisance-defect candidate and deleted from the defect candidate map in step 225, then step 211 in FIG. 7 is applied.

When the difference is judged to be greater than the third threshold value in step 224, the gray level image two periods behind (+2 periods) is read in step 226. The difference between the two is calculated in step 227. In step 228, whether the difference is greater than the third threshold value is judged and, if it is less, it can be regarded as a nuisance-defect candidate and deleted from the defect candidate map in step 225, and then step 211 in FIG. 7 is applied. If greater, it is left in the defect candidate map in step 229 and step 211 is applied. In the case in which this comparison is made only once, step 211 is applied when the difference is judged to be greater than the threshold value in step 224.

Since the process in the second embodiment is applied only to the part detected finally as a defect candidate, the memory addresses to be accessed are not continuous, therefore, the process is inappropriate for the pipeline process. The number of the parts detected finally as a defect candidate, however, is not large and a problem is not particularly caused if the process in the second embodiment is performed with a pipeline data processing processor. In a case in which the use of the pipeline data processing processor for the process in the second embodiment results in inefficiency overall, it is possible to perform the process in the second embodiment with, for example, a processor with low processing performance being employed separately.

Although it is described above that the defect candidate detected in the defect candidate detection section 2 is further analyzed in the ADC 3, it may be a case in which it is not necessary to classify defects in ADC when what is detected as a defect candidate in the present invention is only a pattern short.

Although an example in which the patterns of the metal wire layer of the semiconductor device are put in the cell-cell comparison in the double detection is described above, the present invention is not restricted to this case, but can be applied to the die-die comparison, the single detection, patterns of other than the metal wire layer, and patterns of other than a semiconductor device. In each embodiment, the examples in which each operation process is performed by the pipeline data processing processor are shown, but it is also possible to perform the processes using operation circuits. For example, the comparison process can be performed using a comparison circuit, and the delay process, using a delay circuit. A normal processor can be also used instead of the pipeline data processing processor.

As described above, according to the present invention, it is possible to detect defect candidates that need to be detected without fail and reduce the number of defect candidates that need not to be detected because, without degrading the sensitivity to detect defect candidates of one of polarities, it is possible to suppress the detection of defect candidates of the other polarity.

We claim:

1. A pattern inspection method of judging a part as a defect candidate, in which a mismatch is found by a comparison between the same patterns, the method comprising:
generating a differential image by calculating the difference, including the polarities, between two patterns to be compared;
comparing the absolute value of the differential image with a first threshold value and the part where the first threshold value is exceeded being detected as a defect candidate; and
inspecting the polarities of the differential image of the part of the defect candidate and the part of one of the polarities being judged a defect candidate.

2. A pattern inspection method as set forth in claim 1, wherein the absolute value of the differential image of the part of the defect candidate of the other polarity is compared with a second threshold value, which is greater than the first threshold value, and when the second threshold value is exceeded, the part is included among final defect candidates.

3. A pattern inspection method as set forth in claim 1, wherein two of the differential images are generated with respect to two different patterns and the part, at which two parts where the absolute values of the two differential images are greater than the first threshold value overlap each other, is judged to be a defect candidate.

4. A pattern inspection method as set forth in claim 3, wherein a third differential image is further generated between the part of the defect candidate and a third pattern other than the two different patterns and the part is determined as a defect candidate when the absolute value of the third differential image is greater than a third threshold value.

5. A pattern inspection method as set forth in claim 4, wherein a fourth differential image is further generated between the part of the defect candidate and a fourth pattern other than the three differential patterns and the part is determined as a defect candidate when the absolute value of the fourth differential image is greater than a fourth threshold value.

6. A pattern inspection method comprising an image generation step in which a multivalued image of plural pattern units having the same pattern is generated, a defect candidate detection step in which the two pattern units are compared and the part at which a mismatch is found is detected as a defect candidate, and an analysis step in which the defect candidate is analyzed, wherein, a differential image is generated by calculating the difference, including the polarity, of the two pattern units to be compared in the defect candidate detection step; the absolute value of the differential image is compared with a first threshold value and the part where the first threshold value is exceeded is detected as a first defect candidate; and the polarities of the differential image of the part of the first defect candidate are inspected and the part of one of the polarities is detected as a defect candidate.

7. A pattern inspection method as set forth in claim 6, wherein the absolute value of the differential image of the part of the first defect candidate of the other polarity is compared with a second threshold value, which is greater than the first threshold value, and when the second threshold value is exceeded, the part is included among the defect candidates.

8. A pattern inspection method as set forth in claim 6, wherein two of the differential images are generated with respect to two different pattern units and the part, at which two parts where the absolute values of the two differential images are greater than the first threshold value overlap each other, is judged as a first defect candidate.

9. A pattern inspection method as set forth in claim 8, wherein a third differential image is further generated between the defect candidate and a third pattern unit other than the two pattern units and determined as a defect candidate when the absolute value of the third differential image is greater than a third threshold value.

10. A pattern inspection method as set forth in claim 9, wherein a fourth differential image is further generated between the defect candidate and a fourth pattern unit other than the three different pattern units and determined as a defect candidate when the absolute value of the fourth differential image is greater than a fourth threshold value.

11. A pattern inspection method as set forth in claim 6, wherein: the plural pattern units are arranged at fixed pitches; multivalued images are generated sequentially by relatively moving a one-dimensional image pickup device in the arrangement direction with respect to the plural pattern units in the image generation step; and the generation of the differential image, the detection of the first defect candidate, and the detection of the part of one of the polarities as a defect candidate in the defect candidate detection step are performed successively by the pipeline data process.

12. A pattern inspection method as set forth in claim 11, wherein the differential image is generated sequentially between two adjacent pattern units in the relative movement direction and in the detection of the first defect candidate, the part, at which two parts where the differential images between each pattern unit and two adjacent pattern units on both sides are greater than the first threshold value overlap each other, is judged as the first defect candidate.

13. A pattern inspection apparatus that judges a part as a defect candidate, at which a mismatch is found by a comparison between the same patterns, comprising: an image generation device that generates a multivalued image of the pattern; a differential image generation circuit that generates the differential image by calculating the difference, including the polarities, of the two patterns to be compared; a first comparison circuit that compares the absolute value of the differential image with a first threshold value and detects the part as a defect candidate, where the first threshold value is exceeded; and a defect polarity judgment circuit that inspects the polarities of the differential image of the part of the defect candidate and judges the part of one of the polarities as a defect candidate.

14. A pattern inspection apparatus as set forth in claim 13, wherein a second comparison circuit is further provided, which compares the absolute value of the differential image of the part of the defect candidate of the other polarity with a second threshold value that is greater than the first threshold value, and the part is included among the defect candidates when the second threshold value is exceeded.

15. A pattern inspection apparatus as set forth in claim 13, wherein, the differential image generation circuit generates two differential images with respect to two different patterns and the first comparison circuit judges the part, at which two parts where the absolute values of the two differential images are greater than the first threshold value overlap each other, as a defect candidate.

16. A pattern inspection apparatus as set forth in claim 15, further comprising: a first defect differential image generation circuit that further generates a third differential image between the part of the defect candidate and a third pattern other than the two different patterns; and a third comparison circuit that leaves the part as a defect candidate when the absolute value of the third differential image is greater than a third threshold value and leaves out of the defect candidates, when less.

17. A pattern inspection apparatus as set forth in claim 16, further comprising: a second defect differential image generation circuit that further generates a fourth differential image between the part of the defect candidate and a fourth pattern other than the three different patterns; and a fourth comparison circuit that leaves the defect candidate as a final defect candidate when the absolute value of the fourth differential image is greater than a fourth threshold value and leaves out of the defect candidate, when less.

18. A pattern inspection apparatus, comprising: an image generation section that generates a multivalued image of plural pattern units having the same pattern, a defect candidate detection section that compares the two pattern units and detects a part at which a mismatch is found as a defect candidate, and an analysis section that analyzes the defect candidate, wherein the defect candidate detection section comprises: a differential image generation circuit that generates a differential image by calculating the difference, including polarities thereof, between the two pattern units to be compared; a first comparison circuit that compares the absolute value of the differential image with a first threshold value and detects a part where the first threshold value is exceeded as a first defect candidate; and a defect polarity judgment circuit that inspects the polarities of the differential image of the part of the first defect candidate and detects the part of one of the polarities as a defect candidate.

19. A pattern inspection apparatus as set forth in claim 18, wherein the defect candidate detection section comprises a second comparison circuit, which compares the absolute value of the differential image of the part of the first defect candidate of the other polarity with a second threshold value that is greater than the first threshold value, and includes the part among the defect candidates when the second threshold value is exceeded.

20. A pattern inspection apparatus as set forth in claim 18, wherein the differential image generation circuit generates two differential images with respect to two different pattern units and the first comparison circuit judges a part, at which two parts where the absolute values of the two differential images are greater than the first threshold value overlap each other, as a defect candidate.

21. A pattern inspection apparatus as set forth in claim 20, wherein the defect candidate detection section further comprises a third comparison circuit that generates a third differential image between the part of the defect candidate and a third pattern unit other than the two different pattern units and leaves the part as a defect candidate when the absolute value of the third differential image is greater than a third threshold value and leaves out of the defect candidates, when less.

22. A pattern inspection apparatus as set forth in claim 21, wherein the defect candidate detection section further comprises a fourth comparison circuit that generates a fourth differential image between the part of the defect candidate and a fourth pattern unit other than the three different pattern units and leaves the part as a defect candidate when the absolute value of the fourth differential image is greater than a fourth threshold value and leaves out of the defect candidates, when less.

23. A pattern inspection apparatus as set forth in claim 18, wherein: the plural pattern units are arranged at fixed pitches; the image generation section sequentially generates multivalued images while relatively moving a one-dimensional image pickup device in the direction of the arrangement with respect to the plural pattern units; the defect candidate detection section comprises a memory and a pipeline data processing processor; and the differential image generation circuit, the first comparison circuit, and the defect candidate polarity judgment circuit are composed of the memory and the pipeline data processing processor.

24. A pattern inspection apparatus as set forth in claim 23, wherein the differential image generation circuit sequentially generates the differential images between two pattern units adjacent in the direction of the relative movement and the first comparison circuit judges a part, at which two parts where the differential images between each pattern unit and two pattern units adjacent on both sides exceed the first threshold value overlap each other, as the first defect candidate.

* * * * *